Patented Nov. 28, 1933

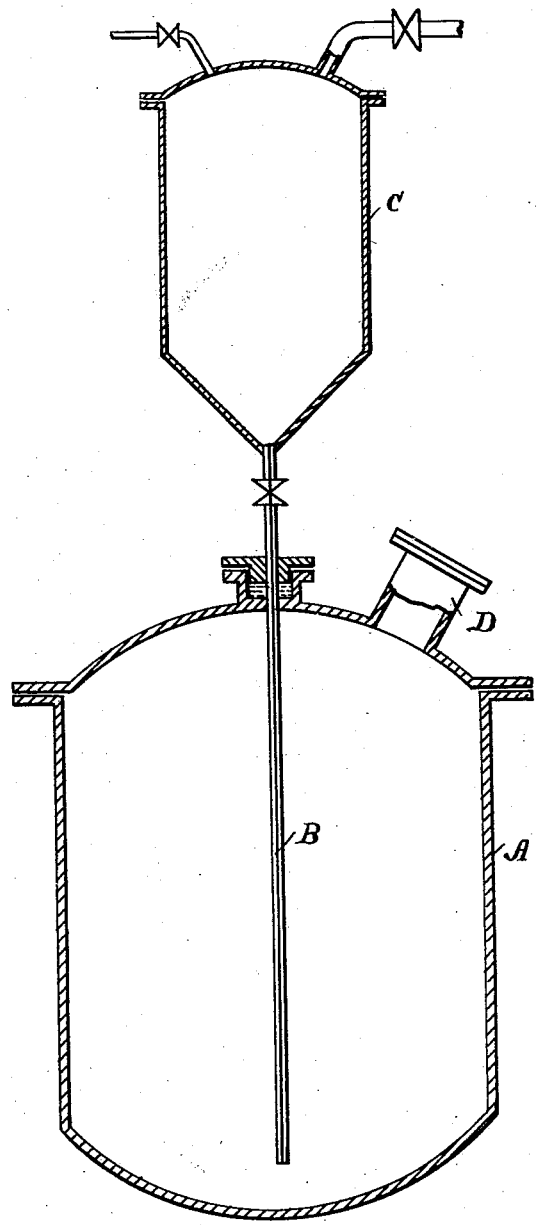

1,937,320

UNITED STATES PATENT OFFICE 1,937,320

SEPARATION OF VOLATILE SUBSTANCES FROM VEGETAL OILS AND FATS AND APPARATUS THEREFOR

Hans Franzen, Mannheim, and Max Schellmann, Oppau, Germany, assignors to I. G. Farbenindustrie Aktiengesellschaft, Frankfort-on-the-Main, Germany Application September 10, 1931, Serial No. 562,056, and in Germany September 17, 1930

9 Claims. (Cl. 87—12)

The present invention relates to improvements in and apparatus for the separation of volatile substances from vegetal oils and fats.

In the distillation of volatile substances from oils and fats of vegetal, i. e. animal or vegetable, origin it is advantageous in many cases to introduce volatile liquids, such as benzine, benzene, toluene, ethylene glycol, formamide, di-butyl-ether, dioxane, glycerol, ethyl alcohol, water or aqueous mixtures or emulsions of the said liquids, into the said oils and fats which are heated above the boiling point of the liquids introduced, if desired at a pressure below atmospheric pressure. Hitherto carrier substances, employed in the form of vapours or inert gases, have been necessary to introduce the said liquids into the material to be treated. For the production of such carrier substances, however, special expenditure of material and energy is necessary and this injuriously affects the economy of the process.

We have now found that the introduction of the said liquids into the said oils and fats which are heated is effected in an extremely simple manner without the aid of carrier substances when the liquids to be introduced are introduced, by sucking and/or pressing, with great speed of at least 40 centimetres per second in a capillary stream, i. e. through capillary pipes having an internal diameter of from 0.2 to 3.5 millimeters, preferably from 0.5 to 1 millimeter, into the material to be distilled. By reason of the high speed at which the liquids flow through the capillaries, the time during which they are in contact with the hot walls of the capillaries is not sufficient to cause the liquids to vaporize in the capillaries. In most cases a velocity of the liquid of from 50 to 100 centimeters per second will be employed; still higher velocities may be employed such as up to say 200 centimeters per second but in this case considerably increased heating of the oil is necessary and an unduly quick distillation may result.

It is especially suitable to select glass or a ceramic mass as the constructional material for the capillaries and to protect the capillaries from breakage by surrounding them with a metal tube.

In this manner also solutions of gases, such as sulphur dioxide, ammonia, carbon dioxide or hydrogen, or salts, as for example sodium carbonate, sodium bicarbonate, common salt, sodium acid sulphite, sodium borates or phosphates and other agents as for example β-naphthalene sulphonic acid, formaldehyde, boric acid or hydrogen peroxide, in the liquids to be introduced or mixtures of such liquids, as for example mixtures of ethyl alcohol and water, of benzene and ethyl alcohol, or of water and formamide, glycols or glycerine, may be introduced into the oils or fats without premature evaporation of the liquids introduced, even if the said oily or fatty materials are heated to temperatures considerably above the boiling point of the liquids introduced at the pressure applied. Thus, for example easily heat-decomposed compounds, such as sodium perborate, hydrogen peroxide or formaldehydesulphoxylic acid sodium salt, may be introduced which are desired to react with the materials to be distilled only at a high temperature, i. e. above the normal decomposition temperature of said salts. For instance in the deacidification of vegetable oils by the said distillation a bleaching of the remaining neutral oil may be carried out by employing an aqueous solution of formaldehydesulphoxylic acid sodium salt or of another bleaching i. e. reducing or oxidizing substance, as for example hydrogen, sulphur dioxide, sodium acid sulphite, hydrogen peroxide or sodium perborate.

The nature of the invention will further be described with reference to the accompanying drawing which illustrates an arrangement of apparatus according to this invention but the invention is not restricted to the particular arrangement shown.

The apparatus consists of a distilling vessel A, through the cover wall of which a capillary B is passed which reaches as far as possible into the material to be distilled. At the outer end of the capillary B there is a reservoir C for the liquid to be introduced which, if desired, may be subjected to pressure in any suitable manner. The tube D may serve for connecting the vessel to any suitable evacuating device.

The following examples will further illustrate the nature of this invention but the invention is not restricted to these examples.

*Example 1*

3 kilograms of arachis oil having a content of 5 percent of free fatty acids are heated to 150° C. at from 15 to 20 millimeters of mercury in the chromium lined steel distilling vessel A having a space of 6 liters of the apparatus hereinbefore described. The reservoir C contains cold water which is pressed by means of compressed air at from 2 to 3 atmospheres and consequently at a velocity of 70 centimeters per second through the capillary pipe B having a length of 60 centimeters and an internal diameter of 0.51 millimeter and is thus introduced into the oil in the form of fine drops, which suddenly evaporate therein in a manner similar to an explosion, while the temperature of the oil is raised to 280° C. The fatty acids are expelled by the water vapour formed so that after a short period of time an arachis oil practically free from acid is obtained.

*Example 2*

Peanut oil having a content of 5 percent of free fatty acids is heated to 150° C. in the manner described in Example 1. A 10 per cent aqueous solution of the sodium salt of formaldehydesulphoxylic acid is pressed through the capillary pipe and the distillation is carried out as described in the foregoing example. A pale oil practically free from free acids is obtained, the shade of which is much paler than that of the original oil.

*Example 3*

Cotton oil containing 4 per cent, by weight, of free fatty acids is subjected to a distillation as described in Example 1 while introducing a 3 per cent aqueous solution of boric acid. An oil which is practically free from free acids and, after filtration, free from mucinous matter, is obtained which possesses after the usual refining with alkali a pale yellow shade.

*Example 4*

A mixture of equal parts of water and formamide is introduced into peanut oil, having a content of 5 percent, by weight, of free fatty acids, in the manner described in Example 1. A practically deacidified oil of pale color is obtained as well as a distillate of fatty acids which furnish a very pale soap.

What we claim is:—

1. In the distillation of volatile substances from vegetable and animal oils and fats by introducing a volatile liquid having a boiling point below that of said oils and fats, into the said oils and fats, which are in the liquid state and heated to a temperature above the boiling point of the said volatile liquid, the step which comprises introducing the said liquid in a continuous, capillary stream at a velocity of at least 40 centimeters per second.

2. In the distillation of volatile substances from vegetable and animal oils and fats by introducing a volatile liquid having a boiling point below that of said oils and fats, at a pressure below atmospheric pressure into the said oils and fats, which are in the liquid state and heated to a temperature above the boiling point of the said volatile liquid, the step which comprises introducing the said liquid in a continuous capillary stream at a velocity of at least 40 centimeters per second.

3. In the distillation of volatile substances from vegetable and animal oils and fats by pressing a volatile liquid having a boiling point below that of said oils and fats, into the said oils and fats, which are in the liquid state and heated to a temperature above the boiling point of the said volatile liquid, the step which comprises introducing the said liquid in a continuous capilliary stream at a velocity of at least 40 centimeters per second.

4. In the distillation of volatile substances from vegetable and animal oils and fats by sucking a volatile liquid having a boiling point below that of said oils and fats, at a pressure below atmospheric pressure into the said oils and fats, which are in the volatile liquid state and heated to a temperature above the boiling point of the said volatile liquid, the step which comprises introducing the said liquid in a continuous, capillary stream at a velocity of at least 40 centimeters per second.

5. In the distillation of volatile substances from vegetable and animal oils and fats by introducing water into the said oils and fats, which are in the liquid state and heated to a temperature above the boiling point of water, the step which comprises introducing the water in a continuous, capillary stream at a velocity of at least 40 centimeters per second.

6. In the distillation of volatile substances from vegetable and animal oils and fats by introducing a volatile liquid into the said vegetal materials, which are in the liquid state, the step which comprises introducing an aqueous solution containing an agent reacting with said difficultly volatile organic materials in a continuous, capillary stream at a velocity of at least 40 centimeters per second, while keeping the said vegetal materials at a temperature above the boiling point of water.

7. In the removal of free acids from vegetable oils containing the same by introducing water into the said oils heated to a temperature above the boiling point of water but below their boiling point, the step which comprises introducing the water in a continuous, capillary stream at a velocity of at least 40 centimeters per second.

8. In the removal of free acids from vegetable oils containing the same by introducing water into the said oils heated to a temperature above the boiling point of water but below their boiling point, the step which comprises introducing an aqueous solution of a bleaching agent in a continuous capillary stream at a velocity of at least 40 centimeters per second.

9. In the removal of free acids from vegetable oils containing the same by introducing water into the said oils heated to a temperature above the boiling point of water but below their boiling point, the step which comprises introducing an aqueous solution of the sodium salt of formaldehydesulphoxylic acid in a continuous capillary stream at a velocity of at least 40 centimeters per second.

HANS FRANZEN.
MAX SCHELLMANN.